United States Patent [19]
Meyer

[11] Patent Number: 5,162,070
[45] Date of Patent: Nov. 10, 1992

[54] BINDING RUBBER EXTRUDER
[75] Inventor: Paul Meyer, Ascona, Switzerland
[73] Assignee: A-Z Formen-und Maschinenbau GmbH, Munich, Fed. Rep. of Germany
[21] Appl. No.: 688,153
[22] Filed: Apr. 19, 1991
[30] Foreign Application Priority Data
  Apr. 20, 1990 [DE] Fed. Rep. of Germany ....... 4012695
[51] Int. Cl.⁵ ............................................. B29C 47/12
[52] U.S. Cl. ....................................... 156/500; 156/96; 156/909; 425/113; 425/224
[58] Field of Search .................. 156/500, 96, 909; 425/113, 114, 115, 224, 325

[56] References Cited
U.S. PATENT DOCUMENTS
2,405,802  8/1946  Taber ...................................... 156/96
2,754,544  7/1956  Bicher .................................. 425/224
3,347,962  10/1967 Dieck et al. ......................... 425/224
3,808,076  4/1974  Barwell .................................. 156/96
3,888,614  6/1975  Foster et al. ......................... 425/224
3,956,056  5/1976  Boguslawski et al. .............. 156/500
4,176,702  12/1979 Sieberling ............................. 156/96

Primary Examiner—Caleb Weston
Attorney, Agent, or Firm—Robert W. Becker & Associates

[57] ABSTRACT

A binding rubber extruder for retreading tires is provided with an extruder head, an axis of which extends essentially vertically to a surface of a carcass. The revolving speed of the rotatably drivable carcass and the extrusion speed are adjusted relative to one another. The extruder head is provided with a nozzle, that has a radius of curvature that corresponds at least to a greatest radius of the carcass whereby the nozzle is pressable against the carcass surface with a gentle, elastic force.

16 Claims, 2 Drawing Sheets

BINDING RUBBER EXTRUDER

BACKGROUND OF THE INVENTION

The present invention relates to a binding rubber extruder for retreading tires having an extruder head, an axis of which extends essentially vertically to a surface of a carcass, whereby the carcass is supported in a rotatably drivable manner and whereby a revolving speed of the carcass and an extrusion speed are adjusted relative to one another.

With a binding rubber extruder of the aforementioned kind that is used for retreading tires, a binding rubber Layer is applied to the roughened carcass before the application of the tread strip. Besides these binding rubber extruders which are also called CTC-extruders (cushion to casing), so called CTT-extruders (cushion to tread) are also known with which the binding rubber layer is applied to the tread strip. Both binding rubber extruders have advantages and disadvantages.

With the known CTC-extruder a careful application of the binding rubber is necessary which requires skilled personnel. The binding rubber strip is supplied in a coil with plastic layers positioned between the binding rubber strips. The intermediate plastic layer is removed and the binding rubber layer is applied to the carcass. Air inclusions and any kind of contamination must be avoided at all costs in order to not reduce the long-term quality of the retreading.

This manual application process results in good quality retreaded tires when the necessary care is provided but it is at the same time rather time consuming and labor intensive.

In another CTC-process narrow binding rubber strips are employed which are applied to the carcass by a machine, whereby the edges of the strips overlap to a certain extent or abut one another in order to cover the entire width of the carcass after a certain number of revolutions.

However, with this process it is difficult to avoid air inclusions on the one hand and to control the final thickness of the binding rubber Layer on the other hand. In a further process of the aforementioned kind it is suggested to directly apply the binding rubber layer to the carcass via an extruder head. The extruder head is of a special shape whereby the axis essentially extends vertically to the surface of the carcass. With this known process there is no nozzle employed but a Lip is provided which more or less exactly fits the contour of the carcass and extends downstream of the binding rubber outlet.

The lower lip is missing, and by exactly controlling the revolving speed of the carcass and the extrusion speed the binding rubber layer is applied to the carcass.

With this process small irregularities of the carcass are supposedly compensated since they are automatically filled. Due to the common binding rubber layer of a thickness of 1.5 mm this is however not achievable in practice.

With this method the carcass must be inflated to a high pressure thereby practically replacing the missing part of the nozzle. Since a certain untrue rotation of the carcass is however unavoidable, this method of applying the binding rubber layer results in a non-uniform thickness of the binding rubber layer on the carcass.

It is also disadvantageous that the profiled lip of the extruder head must be exchanged wit every change of tire type and size, in order to provide for the necessary adjustment.

It is therefore an object of the present invention to provide a binding rubber extruder with which the application of a binding rubber layer onto carcasses of different size and kinds is possible without having air inclusions, whereby, at the same time, the binding rubber layer is applied to untrue carcasses in a more uniform manner.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
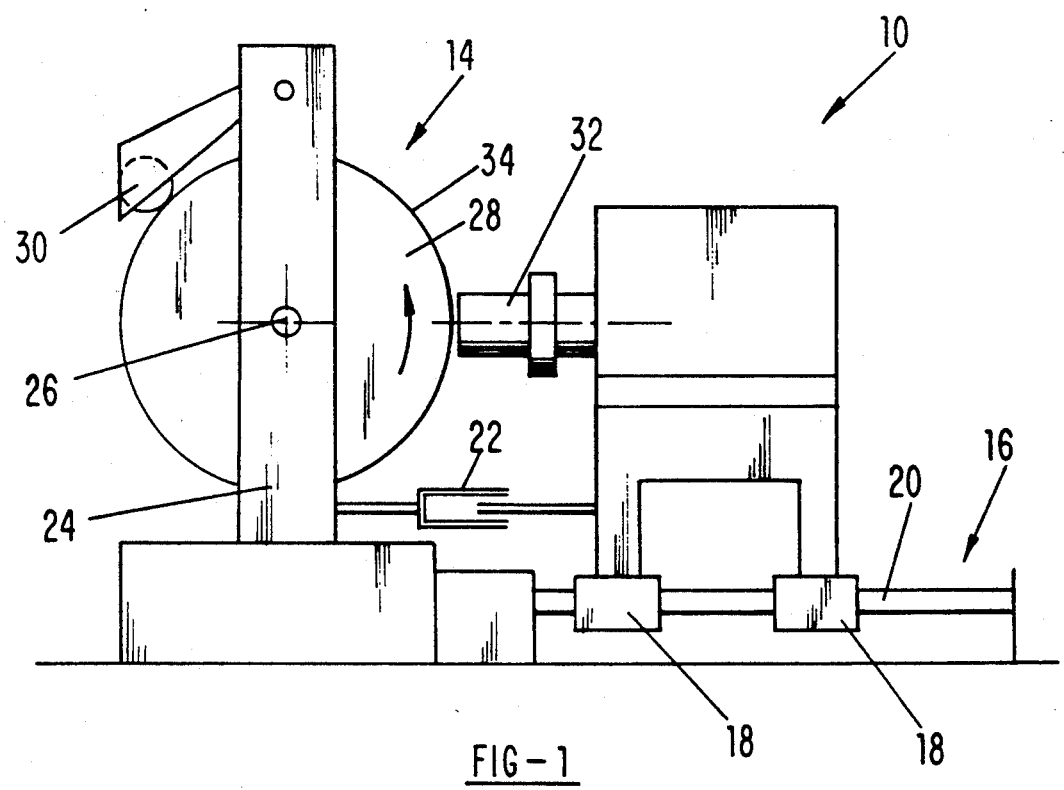
FIG. 1 is a schematic side view of a binding rubber extruder of the present invention.

The binding rubber extruder of the present invention is primarily characterized by an extruder head that has a nozzle with a radius of curvature corresponding at Least to a greatest radius of the carcass surface, whereby the nozzle is pressable against the carcass surface with a gentle, elastic force.

It is especially advantageous that, due to the gentle pressure, the binding rubber is pressed onto the center portion of the roughened carcass surface so that the binding rubber layer is thereby centered, while both sides of the binding rubber layer due to the contact with the cold carcass, contract.

Since contact is achieved first at the center of the carcass and in this position the first cooling occurs, the contracting occurs from the inside to the outside so that air inclusions may be securely avoided. It is possible to attach the binding rubber layer in a known manner, or the prevulcanized tread strip may be applied—if the tire has already been inflated—and the attachment can simultaneously be carried out for the tread and the binding rubber layer.

Surprisingly, a binding rubber layer of uniform thickness may be produced even for relatively untrue carcasses, at Least at commonly used operation speeds of the so-called cold retreading.

It is preferable to minimize the springed mass in order to reduce inertia forces which would result in reduced uniformness of the binding rubber layer. Optionally, the spring may be simulated by a servo control, which records the exerted pressure and keeps it constant via a respective control circuit. For example, a translatory drive may be employed to maintain the distance between the extrusion unit and the carcass drive unit at a desired value.

In a preferred embodiment an extruder unit and a carcass drive unit that are movable relative to one another are provided, whereby a direction of movement is chosen such that the axis of the extruder head is essentially perpendicular to the carcass surface for various carcass diameters. Preferably the extruder unit is mounted on a guide slide of easy motion and the means for pressing the nozzle against the carcass surface with a gentle, elastic force is provided in the form of a working cylinder that is disposed between the extruder unit and the carcass drive unit. The guide slide is preferably supported via a roller bearing means.

As an alternative, a pneumatic working cylinder may be provided with which a gentle, elastic pressure is exerted.

Preferably the extruder unit after completion of a binding rubber layer on the carcass, is automatically removed to facilitate access to the carcass.

It is also advantageous, that due to the inventive interaction of the elastic pressure forces and the profiled extruder head face the thickness of the binding rubber layer may be adjusted within certain limits, whereby the revolving speed of the carcass and the extrusion speed are in a defined relation to one another. In this case it is preferable to monitor the tangential speed of the carcass and to control the extrusion speed in an automatic manner relative to the recorded revolving speed. Thus, it is unnecessary to adjust the defined relation when the carcass size is changed during a carcass exchange.

Preferably, a tangential velocity sensor is provided for monitoring the carcass.

According to the present invention it is especially advantageous that with simple means safety shut-downs may be achieved. When the binding rubber strip that is conveyed by the extruder head is interrupted or when for a certain time the extruder head is heated without binding rubber being extruded, respective counter measures such as a shut-down respectively automatic cooling may be carried out immediately. It is also very simple to synchronize the timely sequence of the application by controlling the carcass drive unit and the extrusion unit, thereby creating a defined beginning and a defined end of the binding rubber layer on the carcass.

After the completion of the application of the binding rubber layer it is preferable to rotate the carcass past the 360° point in order to achieve a smearing of the abutting ends so that they are smooth and invisible to the eye.

It is advantageous to provide the extruder head with an extruder bar which may, for example, consist of aluminum and has a concave radius of curvature that is comparatively large, especially is greater than or at least as great as the radius of the carcass to be processed. Also, in this area the nozzle may be disposed. Preferably the nozzle is essentially disposed at a center of the extruder head and, with a radius of the carcass being smaller than a radius of extruder head, is contacting the carcass.

With an extrusion bar of the aforementioned kind carcasses with smaller diameters may be processed easily whereby a contact is achieved only in the center so that at this Location a smearing of the binding rubber layer occurs. In order to provide for a universal applicability it is preferable to be able to adjust the extrusion width.

In a preferred embodiment, the nozzle has a planar, rectangular cross-section. Furthermore, it is advantageous that the nozzle has an essentially rectangular cross-section with sides of the nozzle, in an axial direction of the carcass, increasing in height. Preferably, the extruder head is provided with distributors which uniformly distribute extruded binding rubber over the entire width of the nozzle. In a preferred embodiment, the extruder unit is in the form of a mixing unit with which two different components of binding rubber may be processed.

DESCRIPTION OF PREFERRED EMBODIMENTS

The present invention will now be described in detail with the aid of several specific embodiments utilizing FIGS. 1 to 3.

An inventive binding rubber extruder 10 is provided with an extruder unit 12 and a carcass drive unit 14 The extruder unit 12 is guided in a slidable manner in a guide slide 16 in a direction to and from the carcass unit 14. A total of four ball boxes 18 are provided, two of which are represented in FIG. 1. The ball boxes 18 allow for a guiding of easy action of the extruder unit 12 on the rail 20 of the guide slide 16.

Between the carcass unit 14 and the extrusion unit 12 a working cylinder 22 is disposed which is pneumaticaly actuatable and which generates a pulling force between its fixation points at the carcass unit 14 and the extruder unit 12.

The carcass unit 14 is provided with a frame 24 that supports an axle 26 on which a carcass 28 is rotatably supported. In the represented embodiment a grooved roll 30 is provided in order to drive the carcass 28. The grooved roll 30 acts onto the carcass 28 in a well known manner.

It is understood that other kinds of carcass drives may be employed also.

Figure 2:
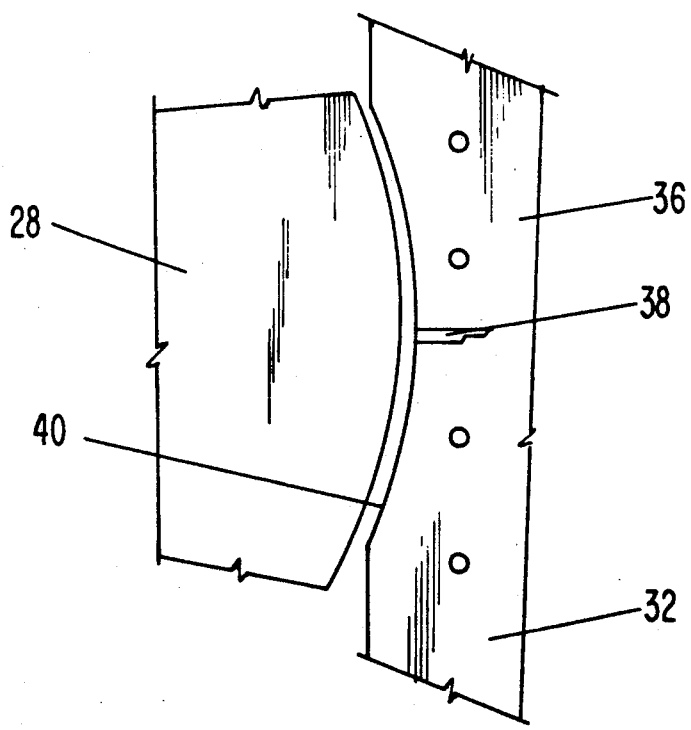
FIG. 2 is an enlarged representation of a detail of FIG. 1.

The extruder unit 12 is provided with an extruder head 32 which contacts a surface 34 of the carcass 28 and which is represented in detail in FIG. 2.

As can be seen from FIG. 2, the extruder head 32 is provided with an extruder bar 36 which preferably consists of aluminum. A slot-shaped nozzle 38 is provided at the extruder bar 36 which serves as the outlet for the binding rubber onto the carcass 28. The surface of the extruder bar 36 that is facing the carcass 28 is concavely shaped. Since the diameter of the carcass 28 is smaller than twice the radius of the surface 40 of the extruder bar 36, the carcass 28 is in constant contact with the extruder bar 36 in the area of the nozzle 38.

Figure 3:
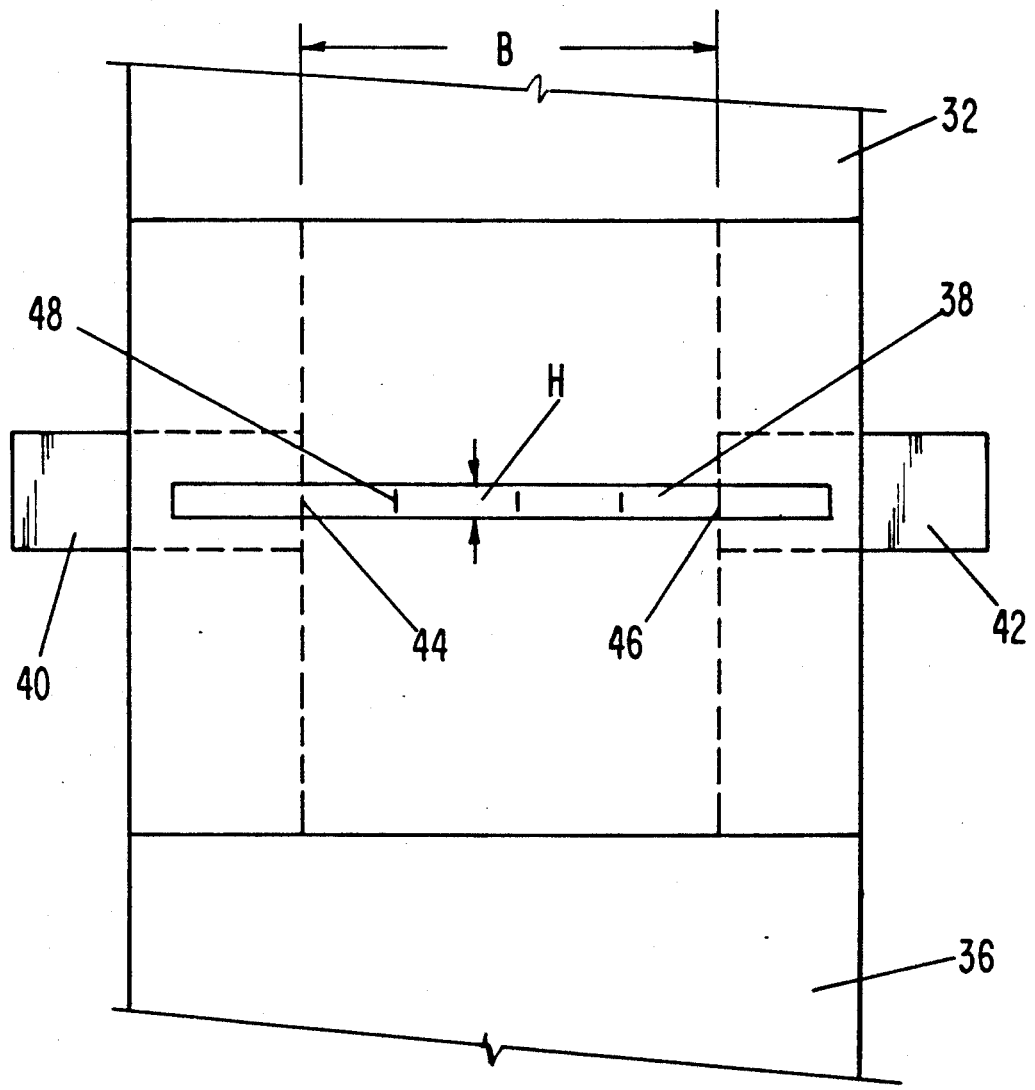
FIG. 3 shows an end view of the extruder head.

FIG. 3 shows an end view of the extruder head 32, viewed along the extended axis of the nozzle 38. The carcass 28 is represented in a dash-dotted line. It has a width B. The nozzle 38 is provided with width adjusting slides 40 and 42 that serve as partial templates. The width adjusting slides 40 and 42 may be used to cover the outer edge of the nozzle 38 so that an adjustment to the respective width of the carcass 28 is possible.

In the represented embodiment the nozzle 38 has a constant height H. It is, however, understood that a different profile may be chosen for the nozzle 38. For example, the nozzle may be widened to some extent in the area of the partial templates 40 and 42 so that the respective height of the nozzle 8 is greater in this area. The respective partial templates 40 and 42 may also be provided with a slanted edge portion 44 and 46 (in FIG. 3 a respective straight edge portion 44 and 46 is represented resulting in a rectangular shape of the nozzle 38).

FIG. 3 also shows distributors 48 in a schematic representation with which the extruded rubber is uniformly spread over the entire width of the nozzle 38.

The nozzle 38 is preferably embodied with a smooth inner contour whereby distributors that are not represented in the drawing are arranged at the extruder head 32 which provide for a uniform loading of the binding rubber over the entire width of the nozzle 38. The slot size of the nozzle 38 is Preferably chosen such that a smooth plate of 0.8 to 1 mm thickness is extruded there-with. It is understood that by increasing the relative speed of the carcass with respect to the extrusion speed the binding rubber Layer produced will have a reduced thickness.

It is also advantageous that the temperature of the extruded binding rubber will be reduced to the temperature of the carcass within a short period of time so that when the temperature Limit of 80° C. is exceeded the effects are controllable. It is also advantageous that with the grooved roller 30 that, in the direction of rotation of the carcass 28, is arranged behind the upper most point and faces away from the extruder head, the driving action occurs at a location where a collision with the extruder unit 12 is avoided.

The present invention is, of course, in no way restricted to the specific disclosure of the specification and drawings, but also encompasses any modifications within the scope of the appended claims.

What I claim is:

1. In a binding rubber extruder for retreading tires having an extruder head, an axis of which extends essentially perpendicularly to a surface of a carcass, with said carcass being supported in a rotatably drivable manner and with a revolving speed of said carcass and an extrusion speed being adjusted to one another, the improvement wherein:

said extruder head has a nozzle with a radius of curvature in a circumferential direction of said carcass surface that corresponds at least to a greatest radius of curvature of said carcass surface in said circumferential direction; and means for pressing said nozzle against said carcass surface with a gentle, elastic force are provided, said gentle, elastic force being exerted in an essentially radial direction of said carcass.

2. A binding rubber extruder according to claim 1, having an extruder unit and a carcass drive unit that are movable relative to one another, whereby a direction of movement is chosen such that said axis of said extruder head is essentially perpendicular to said carcass surface for various carcass diameters.

3. A binding rubber extruder according to claim 2, in which said extruder unit is mounted on a guide slide of easy motion and said means for pressing said nozzle against said carcass surface with said gentle, elastic force is provided in the form of a working cylinder that is disposed between said extruder unit and said carcass drive unit.

4. A binding rubber extruder according to claim 3, in which said guide slide is supported via a roller bearing means.

5. A binding rubber extruder according to claim 3, in which said working cylinder is pneumatically operated.

6. A binding rubber extruder according to claim 3, in which said extruder unit is in the form of a mixing unit with which two different components of binding rubber are processed.

7. A binding rubber extruder according to claim 3, in which said extruder unit, after completion of a binding rubber layer on said carcass, is automatically removed to facilitate access to said carcass.

8. A binding rubber extruder according to claim 1, in which said nozzle has a width corresponding to a respective carcass width.

9. A binding rubber extruder according to claim 6, in which said nozzle is adjustable.

10. A binding rubber extruder according to claim 7, in which said nozzle has a planar, rectangular cross-section.

11. A binding rubber extruder according to claim 6, in which said nozzle has an essentially rectangular cross-section with sides of said nozzle, in an axial direction of said carcass, increasing in height.

12. A binding rubber extruder according to claim 1, in which said extruder head is provided with distributors which uniformly distribute extruded binding rubber over the entire width of said nozzle.

13. A binding rubber extruder according to claim 1, in which said nozzle is essentially disposed at a center of said extruder head and, with a radius of said carcass being smaller than a radius of said extruder head, is contacting said carcass.

14. A binding rubber extruder according to claim 1, in which said revolving speed of said carcass and said extrusion speed are adjustable for adjusting a thickness of a binding rubber layer.

15. A binding rubber extruder according to claim 12, in which a tangential velocity sensor is provided for said carcass.

16. A binding rubber extruder according to claim 1, in which a binding rubber layer is applicable within one full revolution of said carcass, whereby said carcass, after said binding rubber layer has been applied, is turned to a small extent past a point of said one full revolution to form a binding rubber lip with which a connection between a beginning and an end of said binding rubber layer is coverable.

* * * * *